United States Patent [19]

McKay

[11] 4,121,853
[45] Oct. 24, 1978

[54] FIFTH WHEEL BEARING ATTACHMENT

[76] Inventor: Roy H. McKay, 6305 Mahoning Ave., Youngstown, Ohio 44515

[21] Appl. No.: 808,796

[22] Filed: Jun. 22, 1977

[51] Int. Cl.² .............................................. B62D 53/08
[52] U.S. Cl. ..................................... 280/433; 280/515; 308/136
[58] Field of Search ........... 280/515, 432, 433, 438 R, 280/438 A; 308/136

[56] References Cited

U.S. PATENT DOCUMENTS

| 2,503,530 | 4/1950 | Weber | 280/433 |
| 2,662,799 | 12/1953 | Schaefer | 280/433 X |
| 3,091,501 | 5/1963 | Satrum | 280/433 X |
| 3,275,390 | 9/1966 | Franks | 308/136 |
| 3,337,277 | 8/1967 | Arnold | 308/136 |
| 3,887,251 | 6/1975 | McKay | 308/136 |

Primary Examiner—Joseph F. Peters, Jr.
Assistant Examiner—Donn McGiehan
Attorney, Agent, or Firm—Brady, O'Boyle & Gates

[57] ABSTRACT

A preassembled bearing element including a Teflon disc attachable directly to the trailer plates of existing fifth wheel rigs.

4 Claims, 3 Drawing Figures

4,121,853

FIFTH WHEEL BEARING ATTACHMENT

BACKGROUND OF THE INVENTION

The fifth wheel bearing attachment of the present invention is an improvement on the bearing attachment disclosed in my U.S. Pat. No. 3,887,251, dated June 3, 1975, wherein there is disclosed a fifth wheel bearing attachment including a grooved plate interposed a pair of bearing plates, and having suitable fittings for introducing a lubricant between the plates. While the bearing attachment disclosed in the aforementioned patent proved satisfactory for its intended purpose, after further research and experimentation, the bearing attachment of the present invention has been devised which eliminates various components contained in the bearing attachment disclosed in my aforementioned patent, resulting in a bearing attachment having relatively few parts, constructed for long and continued use, and adapted for fabrication at less expense.

The fifth wheel bearing attachment of the present invention comprises, essentially, a Teflon disc interposed a pair of bearing plates; a flanged bushing, adapted to receive the trailer king pin, is welded to one of the bearing plates which bearing plate is detachably connected to the trailer plate.

DESCRIPTION OF THE PREFERRED EMBODIMENT

Figure 1:
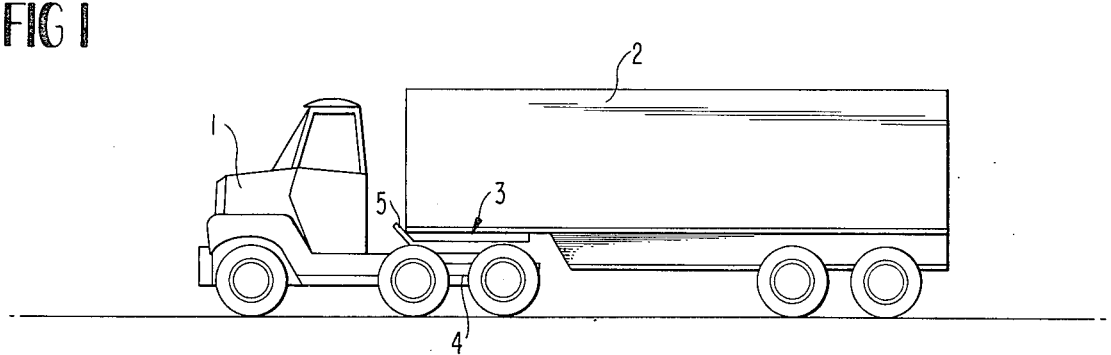
FIG. 1 is a side elevational view of a tractor-trailer rig upon which the fifth wheel bearing attachment of the present invention is adapted to be used.
Figure 2:
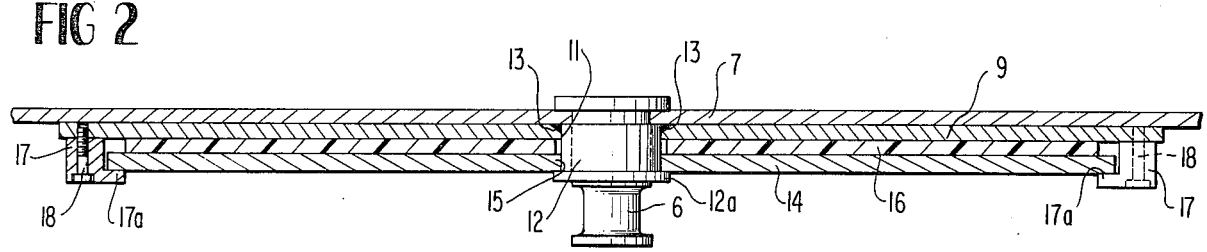
FIG. 2 is a sectional view of the bearing attachment of the present invention connected to the bottom wall of the trailer body.

Referring to the drawings, and more particularly to FIGS. 1 and 2, there is shown a tractor 1 coupled to a semi-trailer 2 by a fifth wheel unit designated generally by reference numeral 3. The chassis 4 of tractor 1 mounts a conventional lower fifth wheel plate 5 which includes a slot for receiving a depending king pin 6 secured to and extending through the bottom wall 7 of the trailer.

Figure 3:
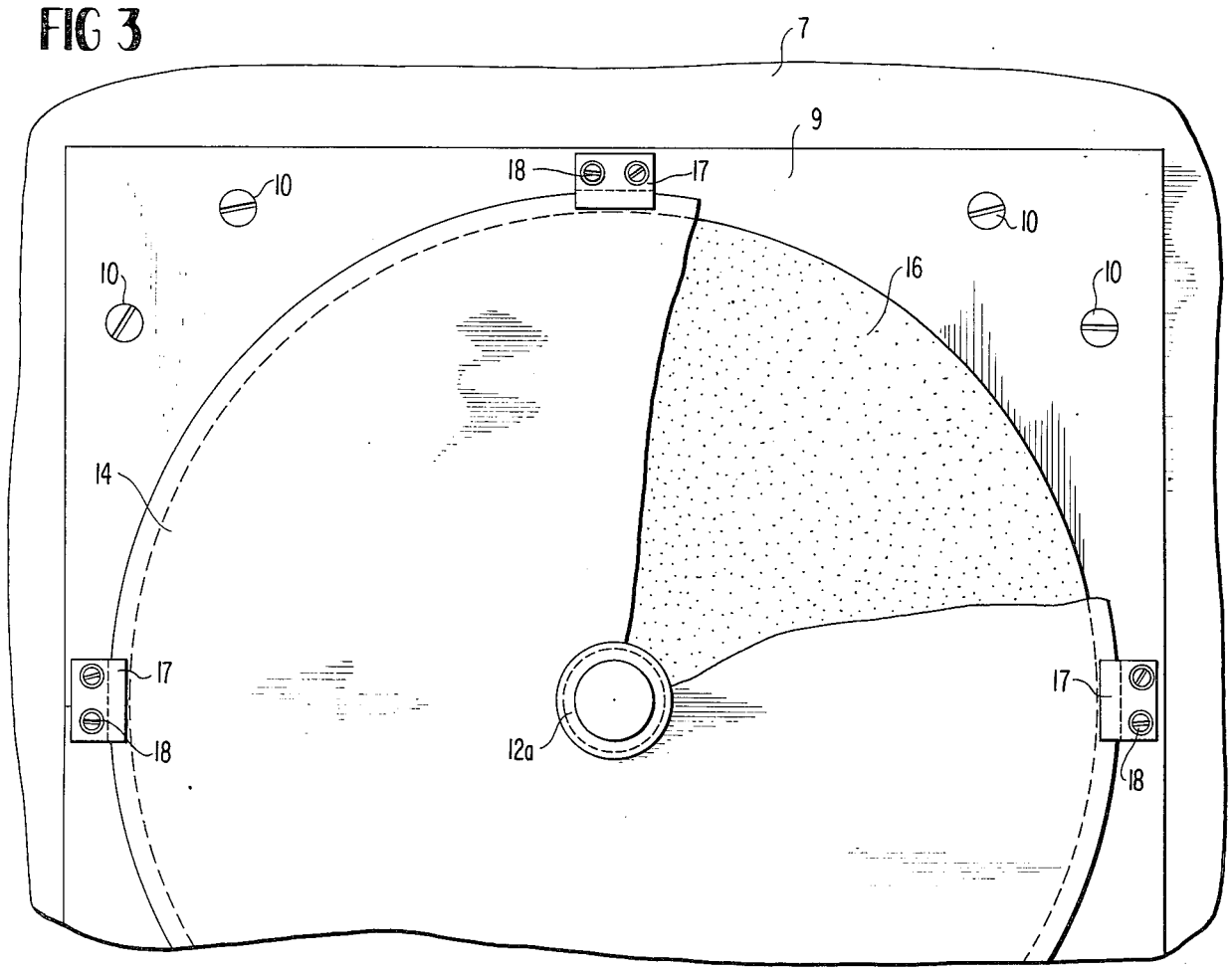
FIG. 3 is a fragmentary, bottom plan view of the assembly shown in FIG. 2.

As will be seen in FIGS. 2 and 3, the fifth wheel bearing attachment of the present invention is shown attached to the bottom wall 7 of the trailer, and comprises a top plate 9 detachably connected to the bottom wall 7 of the trailer by machine screws 10. The plate 9 is provided with a central aperture 11 which receives the upper end of a bushing 12 welded to the plate 9 as at 13. The lower end of the bushing 12 is provided with a flange or collar 12a which supports a bottom plate disc 14 having a central aperture 15 through which the bushing 12 extends. The bottom surface of disc 14 will have direct, face-to-face bearing engagement on the fifth wheel tractor plate 5, with the plate disc 14 being freely rotatable about the bushing 12. To insure as complete an anti-friction, mounting of the assembly as possible, the adjacent faces of plates 9 and 14 are engaged and spaced apart by Teflon bearing plate disc 16 centrally apertured, as shown, to fit over the bushing 12. The upper and lower faces of plate 16 are directly opposed the bearing plates 9 and 14 in load-bearing relation thereto and therebetween. To enhance the face-to-face engagement of the Teflon plate disc 16 with the bearing plates 9 and 14, a plurality of circumferentially spaced, flanged blocks 17 are secured to plate 9 by screws 18, the flanged portion 17a of each block supporting the plate disc 14 along its peripheral edge.

To assemble the bearing attachment of the present invention, the disc 14 is slipped onto the bushing 12 and is seated on the flange 12a. The Teflon disc 16 is then slipped over the bushing 12 and is seated on the flange 12a. The Teflon disc 16 is then slipped over the bushing 12 and is positioned in face-to-face engagement with the disc 14. The plate 9 is then slipped onto the bushing and welded to the upper edge thereof as at 13, and the flanged blocks 17 are then connected to the plate 9. The bearing attachment can then be mounted, as a unit, onto the trailer 2 by slipping the bushing 12, and attached plates 9, 14 and 16, onto the king pin 6 and securing the attachment to the bottom wall of the trailer by screws 10.

When in the operative position, the tractor plate 5 of the fifth wheel assembly is frictionally engaged with the bottom bearing plate 14, and the tractor plate is rotatably locked in place on king pin 6, whereby the tractor plate and the bearing plate 14 will substantially function as an entity, with the load being carried by the Teflon disc 16 thus providing a minimum of frictional rubbing between the lower fifth wheel plate 5 and the bottom wall 7 of the trailer.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a fifth wheel assembly including a bottom wall of a trailer mounting a king pin and a lower slotted tractor plate adapted for locking engagement with said king pin, the improvement comprising a pre-assembled anti-friction device for detachably mounting, as a unit, on said trailer bottom wall, said device comprising a bushing, a flange provided on one end of said bushing, a first bearing plate supported by said flange and rotatably mounted thereon, a second bearing plate, said second bearing plate being centrally apertured for receiving the other end of said bushing, said second bearing plate being rigidly connected to the other end of the bushing, and a third plate positioned between said first and second bearing plates and mounted for free rotation about the bushing, said third plate being formed from anti-friction material; said king pin being freely insertable into said bushing, said second bearing plate being detachably secured to the bottom wall of the trailer, and said first bearing plate being frictionally engageable with and by said tractor plate and rotatable therewith.

2. An anti-friction device according to claim 1, wherein the third plate is formed from Teflon.

3. An anti-friction device according to claim 1, wherein fastening means are connected between the first and second bearing plates to maintain the first and second bearing plates in face-to-face engagement with the third bearing plate.

4. An anti-friction device according to claim 3, wherein the fastening means comprises a plurality of blocks secured to the second bearing plate, and a flange provided on each block supporting an edge of the first bearing plate.

* * * * *